June 16, 1925.                                        1,542,015
C. E. STRICKLAND
VALVE
Filed July 12, 1924
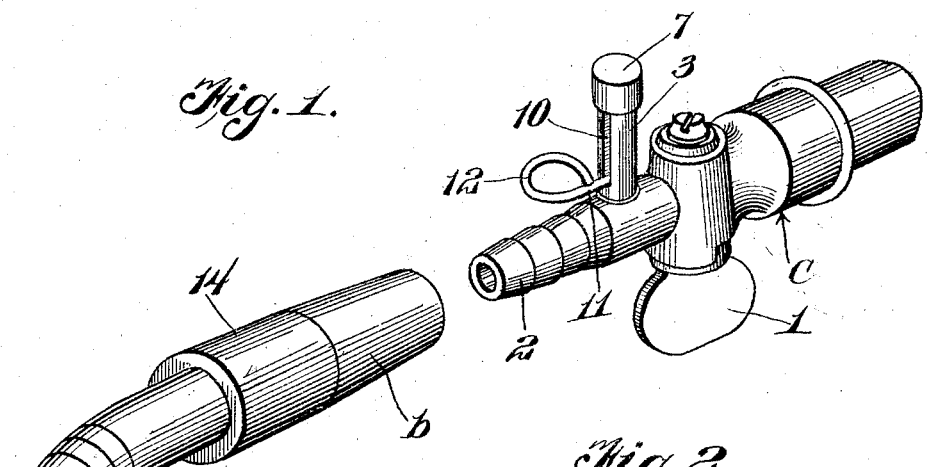
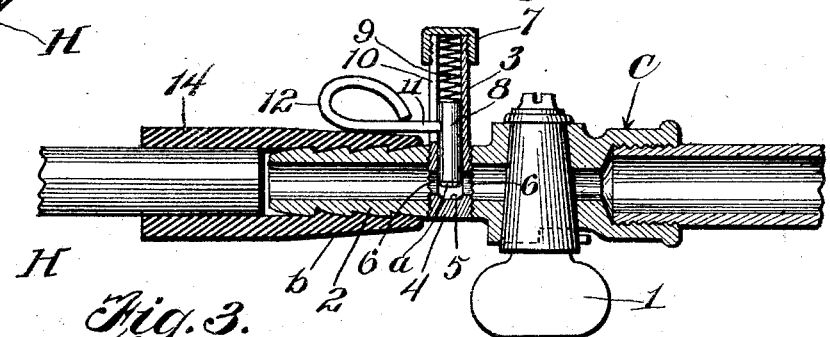
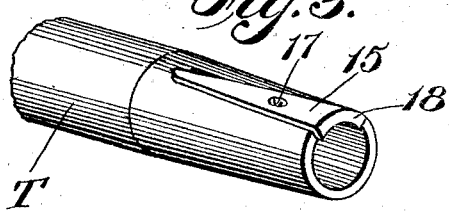
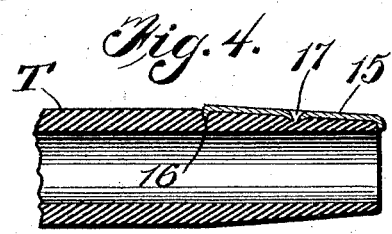
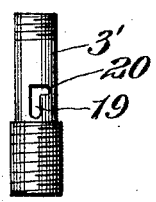
Inventor
Clarence E. Strickland
Watson E. Coleman
Atty Patented June 16, 1925.

1,542,015

UNITED STATES PATENT OFFICE.

CLARENCE E. STRICKLAND, OF ATLANTIC CITY, NEW JERSEY.

VALVE.

Application filed July 12, 1924. Serial No. 725,678.

*To all whom it may concern:*

Be it known that I, CLARENCE E. STRICKLAND, a citizen of the United States, residing at Atlantic City, in the county of Atlantic and State of New Jersey, have invented certain new and useful Improvements in Valves, of which the following is a specification, reference being had to the accompanying drawings.

This invention relates to certain improvements in valves and has relation more particularly to a valve specially designed and adapted for use as a gas cock or the like, and it is an object of the invention to provide a novel and improved valve of this kind of a multiple type wherein one of the valves is automatically moved into open position when a hose or the like is applied to the associated casing and which valve also automatically moves into closed position upon disengagement of the hose or the like from the casing.

Another object of the invention is to provide a novel and improved gas cock or the like including a normally closed valve together with means whereby said valve is moved into open position upon application of a hose or the like to the cock and whereby said valve is maintained in such open position during the period the hose or the like is coupled to the cock.

The invention consists in the details of construction and in the combination and arrangement of the several parts of my improved valve whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in perspective illustrating a valve constructed in accordance with an embodiment of my invention, the associated flexible hose or tube being shown in separated relation;

Figure 2 is a view partly in section and partly in elevation of the structure as illustrated in Figure 1 with the hose or tube in operative engagement with the discharge stem of the cock;

Figure 3 is a fragmentary view in perspective illustrating a slightly modified hose or tube structure;

Figure 4 is a sectional view taken longitudinally through the structure as illustrated in Figure 3;

Figure 5 is an elevational view illustrating a tubular member constructed in accordance with another embodiment of my invention.

As disclosed in the accompanying drawings, C denotes a cock of the type generally employed in connection with a hose gas line and wherein the flow therethrough is under control of a conventional manner by the rotating valve member 1.

Disposed through the discharge stem 2 of the cock C is an end portion of a tubular member 3, said member as herein disclosed being in threaded engagement with the stem 2 although it is to be understood that the same may be applied in any manner preferred.

The inner or inserted end portion of the member 3 is closed, as at 4, and the inner face of such head 4 is provided with the ground valve seat 5 while the wall of the member is provided with the opposed openings 6 in register with the bore of the discharge stem 2 of the cock C whereby gas or the like may readily flow therethrough.

As herein disclosed the tubular member 3 extends upwardly and has its outer end portion closed by a cap 7. Snugly fitting within the member 3 is a sliding valve 8 having its inner end portion tapered, as at $a$, for effective engagement with the valve seat 5 hereinbefore referred to, said valve 8 when in engagement with the seat 5 also effectively closing the openings 6 to shut off flow through the stem 2.

The valve 8 is constantly urged toward its seat 5 by the expansible member 9 herein disclosed as a coil spring arranged within the member 3 interposed between the inner end of the valve 8 and the applied cap 7. The wall of the extended portion of the tubular member 3 is provided with the longitudinally disposed slot 10 preferably open at its outer end and extending through the slot and fixed to the valve 8 is a pin or shank 11, said pin or shank having its outer end continued by a returned extension 12 preferably in the form of a loop to provide means whereby the valve 8 may be conveniently moved into open position or outwardly of the member 3 when desired.

The flexible hose or tube H which is of a type generally employed in connection with gas fixtures has applied to one end portion a nipple or socket 14 which is adapted to have a telescopic engagement with the discharge stem 2 of the cock C as is particularly illustrated in Figure 2. The outer end portion b of this sleeve or nipple 14 is arranged on a taper so that when the nipple or sleeve 14 is operatively engaged with the stem 2 it will wedge itself between the stem 2 and the shank 11 and thereby move the valve 8 outwardly into open position so that there will be a free flow through the cock C when the valve member 1 is in open position. In the event, however, the sleeve or nipple 14 is pulled off or disengaged from the stem 2 the spring 9 will operate to force the valve 8 into closed position.

In the embodiment of my invention as illustrated in Figure 3 the end portion of the hose or tube T has secured thereto a wear plate 15 which is provided at its inner end with a prong 16 adapted to impinge the tube T and is provided intermediate its ends with the burr 17 also adapted to impinge the tube T whereby the plate 15 is effectively maintained in applied position. The outer end of the plate is preferably defined by an inwardly disposed flange 18 which overlies the adjacent outer or end edge of the tube. In practice, when the tube T is engaged with the stem 2 the plate 15 is adapted to ride in under the shank 11.

In Figure 5, I illustrate a modified form of tubular member 3' wherein the wall thereof is provided with a bayonet slot 19 a branch or extension 20 being at the outer end thereof. By use of the slot 19 the shank 11 when the valve is in its open position may readily turn to engage in the extension 20 to positively hold the valve in open position.

In using the form of tubular member 3' the shank 11 will be engaged with the valve 8 after the valve has been properly inserted therein while with the use of the member 3 the shank 11 can be secured to the valve 8 before said valve is applied as said shank 11 will readily pass within the slot 10 through the outer open end thereof at the time the valve 8 is inserted within the member 3, it being understood, of course, that when applying the valve 8 and shank 11 the cap 7 is removed.

From the foregoing description it is thought to be obvious that a valve constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a conduit, a tubular member carried by and in communication with the conduit, a valve slidably mounted within the tubular member and extending within the conduit to close the flow therethrough, means for constantly maintaining the valve in closed position, a wall of the tubular member being provided with a slot, and a shank secured to the valve and extending outwardly through the slot.

2. In combination with a conduit, a tubular member carried by and in communication with the conduit, a valve slidably mounted within the tubular member and extending within the conduit to close the flow therethrough, means for constantly maintaining the valve in closed position, a wall of the tubular member being provided with a slot, and a shank secured to the valve and extending outwardly through the slot, said shank being extended to provide a grip.

3. In combination with a conduit, a tubular member carried by and in communication with the conduit, a valve slidably mounted within the tubular member and extending within the conduit to close the flow therethrough, means for constantly maintaining the valve in closed position, a wall of the tubular member being provided with a slot, and a shank secured to the valve and extending outwardly through the slot, said extension being returned and forming a loop.

4. In combination with a conduit, a tubular member carried by and in communication with the conduit, a valve slidably mounted within the tubular member and extending within the conduit to close the flow therethrough, means for constantly maintaining the valve in closed position, a wall of the tubular member being provided with a slot, and a shank secured to the valve and extending outwardly through the slot, said tubular member extending through the conduit and having opposed openings in its wall in communication with the bore of the conduit, the inserted end of the tubular member being closed and provided with an internal valve seat with which the valve engages.

5. In combination with two tubular members adapted for telescopic connection, an outstanding tubular member carried by one of the first named tubular members and in communication therewith and having a slot in its wall, a valve slidable within said last named tubular member for closing the flow through the first named tubular member, a shank carried by said valve and extending through the slot in the last named tubular member, the second tubular member when applied to the first named member wedging between said first named member and the shank to move the valve into open position, and means for constantly urging the valve into closed position.

6. In combination with two tubular members adapted to have telescopic connection, a reciprocating valve carried by one of the members for closing the flow therethrough, means for constantly urging said valve into closed position, and a shank carried by the valve and overlying the tubular member, the second tubular member when said members are connected wedging between the first tubular member and the shank for moving the valve into open position and to maintain said valve in such position during the period the tubular members are connected.

In testimony whereof I hereunto affix my signature.

CLARENCE E. STRICKLAND.